(12) United States Patent
Rasmusson et al.

(10) Patent No.: US 7,762,198 B2
(45) Date of Patent: Jul. 27, 2010

(54) FIXTURE WITH MEANS TO ADAPT THE POSITIONS OF LOADING LEDGES

(75) Inventors: Tobias Rasmusson, Lerberget (SE); Peter Larsson, Älmhult (SE)

(73) Assignee: Inter Ikea Systems B.V., Delft (NL)

( * ) Notice: Subject to any disclaimer, the term of this patent is extended or adjusted under 35 U.S.C. 154(b) by 0 days.

(21) Appl. No.: 10/578,042

(22) PCT Filed: Nov. 4, 2004

(86) PCT No.: PCT/SE2004/001599

§ 371 (c)(1), (2), (4) Date: Apr. 12, 2007

(87) PCT Pub. No.: WO2005/044680

PCT Pub. Date: May 19, 2005

(65) Prior Publication Data

US 2007/0227411 A1 Oct. 4, 2007

(30) Foreign Application Priority Data

Nov. 5, 2003 (SE) .................................. 0302921

(51) Int. Cl. *B65D 19/38* (2006.01)
(52) U.S. Cl. ................................. 108/54.1; 108/55.1
(58) Field of Classification Search .............. 108/51.11, 108/54.1, 55.1, 51.3, 55.3, 55.5; 206/386, 206/595, 598, 596, 599, 600; 248/246.02, 248/346.03
See application file for complete search history.

(56) References Cited

U.S. PATENT DOCUMENTS

| | | | | |
|---|---|---|---|---|
| 2,828,931 A | * | 4/1958 | Herbert | 108/54.1 |
| 2,903,217 A | * | 9/1959 | Collins et al. | 108/54.1 |
| 3,411,434 A | * | 11/1968 | Sylvester et al. | 108/52.1 |
| 3,695,187 A | * | 10/1972 | Weiss | 108/54.1 |
| 3,759,192 A | * | 9/1973 | Oehler | 108/54.1 |
| 4,049,135 A | * | 9/1977 | Glassmeyer | 108/55.1 |
| 4,116,344 A | * | 9/1978 | Ziemba | 108/51.3 |
| 4,432,689 A | * | 2/1984 | Shell | 108/55.1 |
| 4,509,433 A | * | 4/1985 | Farr | 108/51.3 |
| 4,543,035 A | * | 9/1985 | Lair | 108/55.1 |
| 4,571,141 A | * | 2/1986 | Gieson | 108/55.1 |

(Continued)

FOREIGN PATENT DOCUMENTS

DE 1 163 734 2/1964

(Continued)

*Primary Examiner*—José V Chen
(74) *Attorney, Agent, or Firm*—Merchant & Gould P.C.

(57) ABSTRACT

A fixture to be used for formation of unit loads of one or more packages on loading ledges is shown. The fixture can adapt the positions of the loading ledges depending on the size and form of the unit loads to be formed. The fixture has a rectangular frame formed of two parallel long struts and two short struts between the ends of the long struts. A number of further intermediate short struts may be arranged between the long struts to stabilize the frame. Four transversal bars are arranged moveable on the long struts. On each transversal bar, two cups are received, of which at least one cup is received moveable on the transversal bar. The cups are to receive the loading ledges.

12 Claims, 3 Drawing Sheets

U.S. PATENT DOCUMENTS

| | | | | |
|---|---|---|---|---|
| 4,717,025 A * | 1/1988 | Maurer | ..................... | 108/55.3 |
| 4,824,050 A * | 4/1989 | Courter | .................... | 108/55.1 |
| 4,850,283 A * | 7/1989 | Carvin | ................... | 108/51.11 |
| 4,911,084 A * | 3/1990 | Sato et al. | .................. | 108/55.3 |
| 4,934,720 A * | 6/1990 | Dobron | .................... | 108/56.1 |
| 5,016,761 A * | 5/1991 | Stoddard et al. | ........... | 108/55.1 |
| 5,297,485 A * | 3/1994 | Bond | ....................... | 108/54.1 |
| 5,388,532 A * | 2/1995 | Wakano | .................... | 108/54.1 |
| 5,497,708 A * | 3/1996 | Jeruzal | .................... | 108/54.1 |
| 5,599,031 A * | 2/1997 | Hodges | .................. | 280/79.11 |
| 5,626,231 A * | 5/1997 | Kwong et al. | .............. | 108/54.1 |
| 5,653,354 A * | 8/1997 | Olson | ........................ | 206/595 |
| 5,676,066 A * | 10/1997 | Cavalier et al. | ........... | 108/55.1 |
| 5,842,424 A * | 12/1998 | Prevot et al. | ............... | 108/54.1 |
| 5,960,958 A * | 10/1999 | Michaud et al. | ......... | 108/51.11 |
| 6,474,245 B2 * | 11/2002 | Richard | .................... | 108/54.1 |
| 6,490,982 B1 * | 12/2002 | Trickett | ................... | 108/51.11 |
| 6,668,734 B2 * | 12/2003 | Lucas et al. | .............. | 108/51.11 |
| 6,938,559 B2 * | 9/2005 | Wullenweber | ........... | 108/51.11 |
| 7,044,066 B1 * | 5/2006 | Miller | ....................... | 108/54.1 |

FOREIGN PATENT DOCUMENTS

| | | |
|---|---|---|
| DE | 91 13 182.0 | 1/1992 |
| GB | 2 053 143 | 2/1981 |
| WO | WO 2004/026713 | 4/2004 |

* cited by examiner though the packages received on the pallets may demand less

FIXTURE WITH MEANS TO ADAPT THE POSITIONS OF LOADING LEDGES

TECHNICAL FIELD

The present invention concerns a fixture to be used for formation of unit loads on loading ledges.

The fixture is intended for use in stockrooms, storerooms, warehouses, factories etc. It is possible to use in any situation where a unit load is to be formed and placed on loading ledges. The fixture is mainly intended for use in manual formation of the unit loads.

As used in this description the term "unit load" refers to one or more packages held together as one unit and received on loading ledges.

PRIOR ART

A unit load consists of one or more packages. Normally the packages are of the same size, but it is also possible to have packages of different sizes. The outer form of the unit loads may vary, depending on the actual packages or the like forming the unit load in question. Thus, the packages forming the respective unit loads may have varying size, form and content.

Today it is common to place packages on (loading) pallets for transportation, storage etc. The pallets are normally of a standardized size. That means that the space occupied in storerooms etc. is dictated by the size of the pallets, even tough the packages received on the pallets may demand less space as such. By using loading ledges the occupied space is based on the sizes of the packages and not a pallet. However, as loading ledges are lose parts, i.e. they cannot stand on their own, there is a need for some means to facilitate forming of unit loads on such loading ledges.

Often special means are developed to automatically forming unit loads on loading ledges. If the number of loading units formed is relatively low and/or if only small series of or even separate unit loads are formed, it may not be feasible to develop such specialized means.

SUMMARY OF THE INVENTION

One object of the present invention is to facilitate forming of unit loads manually on loading ledges.

According to the invention this object is achieved by means of a fixture for forming unit loads, to be received on two or more loading ledges. The loading ledges are placed on the fixture. The fixture has also means to adapt the positions of the loading ledges depending on the size and form of the unit loads to be formed.

In use in storerooms or the like it is common to form a number of identical unit loads at the time. It is also possible that the size and form of the unit loads vary more or less constantly. Thus, the fixture should be relatively easy to adapt to the form of different unit loads.

Furthermore, the formed unit loads on their loading ledges should be relatively easy to lift from the fixture, e.g. by the use of a fork-lift truck or the like.

The fixture of the present invention is flexible and is relatively easy to adapted to different situations.

Further objects and advantages will be obvious for a person skilled in the art when reading the detailed description below of at present preferred embodiments.

BRIEF DESCRIPTION OF THE DRAWINGS

The invention will be explained further below by way of an example and with reference to the enclosed drawings. In the drawings.

DETAILED DESCRIPTION OF PREFERRED EMBODIMENTS

Figure 1:
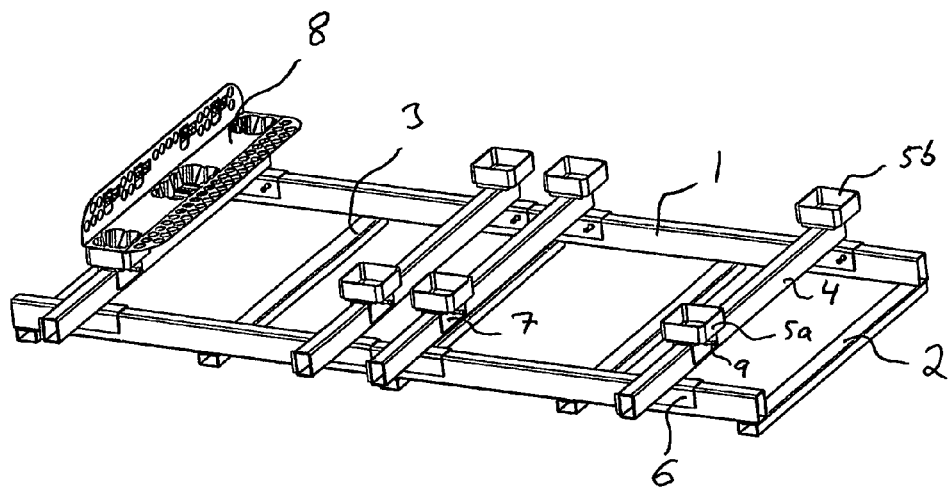
FIG. 1 is a perspective view of a fixture according to the present invention, indicating one possible placing of a loading ledge.

The fixture of the embodiment showed in the enclosed FIGS. comprises a rectangular frame. The rectangular frame is formed of two struts 1 forming the long sides and two struts 2 forming the short ends. Furthermore, a number of intermediate, short struts 3 are arranged between the long m struts 1 to stabilize the frame. In the showed embodiment the short struts 2, 3 are fixed at the lower sides of the long struts 1. In alternative embodiments the long struts and the short struts are placed in the same plane, i.e. on the same level. In this latter case the short sides are fixed to the sides of the long struts. A person skilled in the art realizes that the exact design of the frame is of no importance for the present invention as such. Thus, in other embodiments (not shown) the frame has other designs.

On the long struts 1 four transversal bars 4 are received. The number of transversal bars 4 may vary, but there are always at least two bars 4. By means of supports 6 the transversal bars 4 are received moveable, i.e. they may slide on the long struts 1. The supports 6 are formed of two legs 11 straddling the sides of the long struts 1. The legs 11 are normally integrated parts of the transversal bars 4, but the supports 6 may be separate units fixed to the bars 4. A person skilled in the art realizes that the exact form of the supports 6 may vary, as long as they permit the bars 4 to move. Locking elements are arranged to lock the transversal bars 4 in suitable positions. Such locking elements may have the form of a locking screw 9, as shown, received in an opening of one leg 11 of the support and acting on the long strut 1. A person skilled in the art realizes that the exact form of the locking means may vary as long as it is able to properly lock a desired position of the transversal bar 4.

On each transversal bar 4 two cups 5*a*, 5*b* are arranged. In the shown embodiment one of the cups 5*a* is received on a moveable support 7 on the transversal bar 4, while the other cup 5*b* is fixed to the transversal bar 4 at one end of the bar 4. A person skilled in the art realizes that both cups 5 may be arranged moveable on one or more of the transversal bars 4. The moveable support 7 has two legs 10, which straddle the transversal bars 4 in the shown embodiment. In an opening of one leg 10 a locking screw 9 is received. The free end of the locking screw 9 is to be pressed against the transversal bar 4, on which it is received, when and if the cup 5*a* is to be locked in an appropriate position. The support 7 may be a separate part or an integrated part of the cup 5*a*.

The cups 5a, 5b of the transversal bars 4 are adapted to the form of feet on the loading ledges 8. Thus, each cup 5 is to receive one foot of the loading ledges 8.

Figure 2:
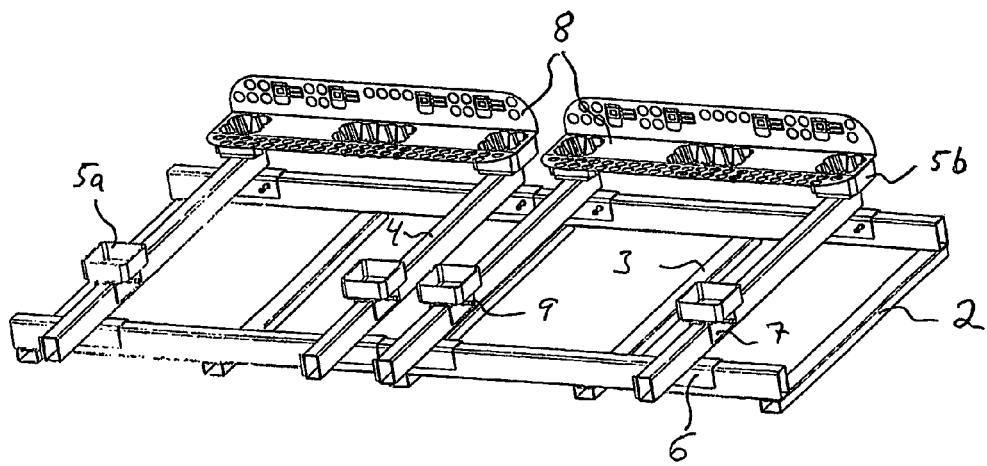
FIG. 2 is a view corresponding to FIG. 1, indicating an alternative placing of the loading ledges.
Figure 3:
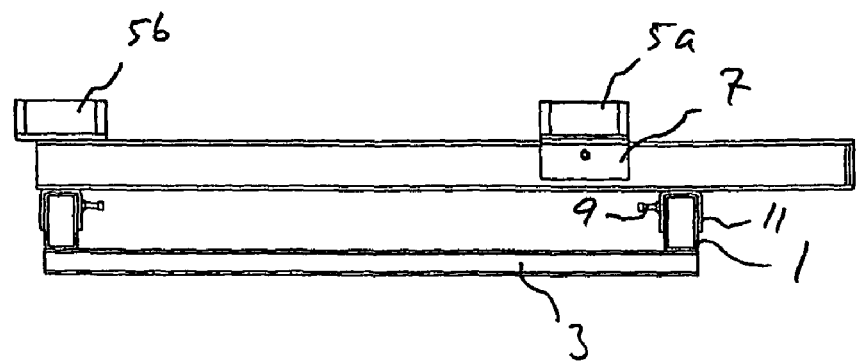
FIG. 3 is an end view of the fixture of FIGS. 1 and 2.
Figure 4:
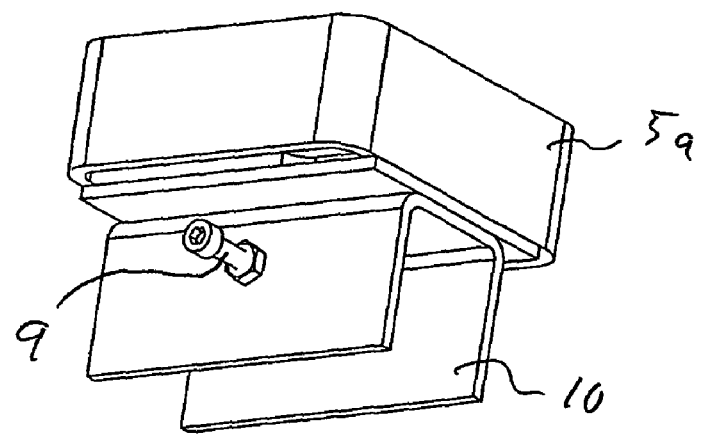
FIG. 4 is a perspective view from below of a part of the fixture.
Figure 5:
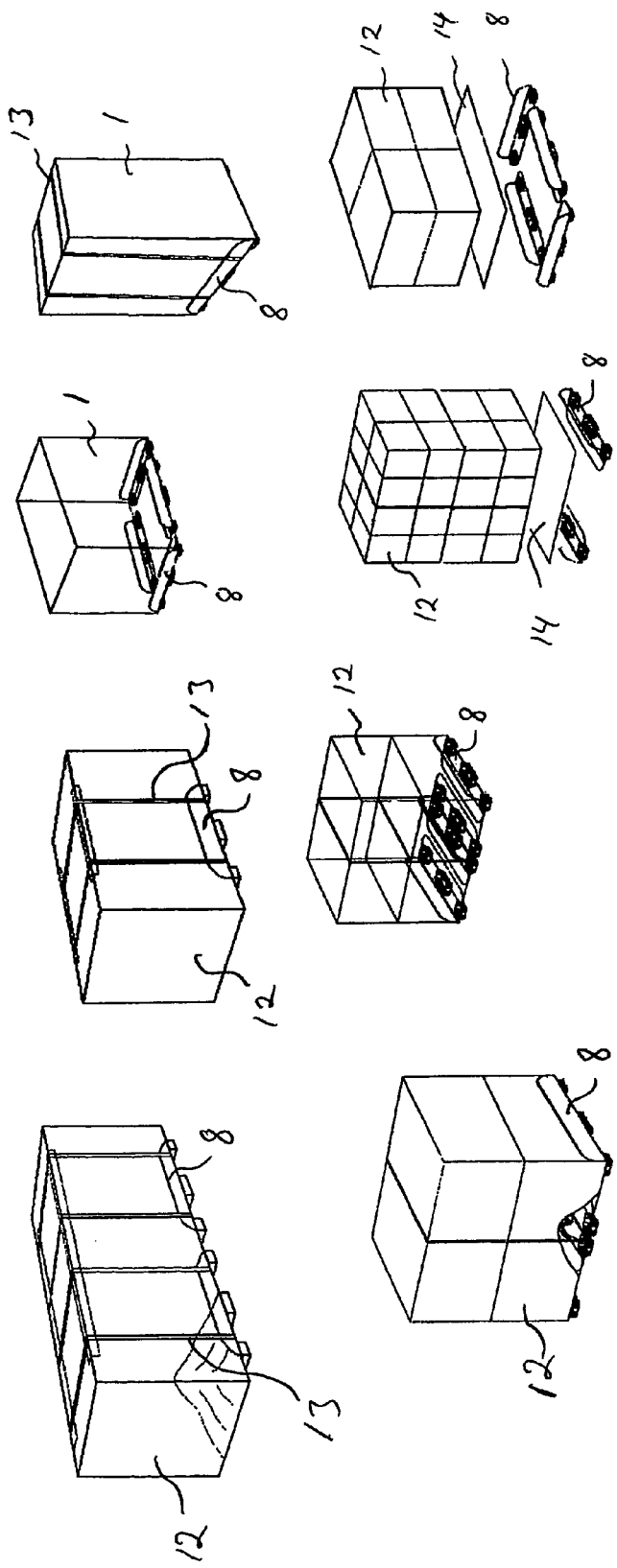
FIG. 5 shows examples of different unit loads.

As indicated in FIGS. 1 and 2 the loading ledges 8 may be placed with both its feet in cups 5 on one transversal bar 4 (FIG. 1), with its feet on two adjacent, transversal bars 4 (FIG. 2) or a combination of this. One possible combination is that one loading ledge 8 is placed on each transversal bar 4 at respective end of the frame, while two loading ledges 8 are placed with one foot on each of the two transversal bars 4 in the center. In this case the unit load formed will have a loading ledge 8 at each lower side. With the loading ledges 8 placed in line on each long side of the frame and placed on two adjacent bars 4, either unit loads with four loading ledges 8 or two parallel unit loads with two loading ledges 8 may be formed. For smaller unit loads it is possible to form two unit loads at the time in parallel on the fixture, if there are four transversal bars 4. If the number of transversal bars 4 is increased the number of unit loads possible to form in parallel on the fixture is also increased.

When the loading ledges 8 are received on two adjacent bars 4, the distance between the bars 4 may be fixed by means of the loading ledges 8. Thus, in such a case no special locking means is needed for the bars 4.

The fixture may be placed on a table giving a suitable height for manually forming unit loads. The table may be adjustable in height in order to give suitable heights during different stages of forming of the unit loads. To adjust the height mechanical linkages, hydraulic or pneumatic cylinders, springs etc. may be used as is well known in the art. Furthermore, the height may be load dependent, i.e. the table sinks automatically as the weight on it increases. It is also possible to have a constant height, i.e. that the upper edge of the uppermost package 12 is kept at a predetermined height. This arrangement facilitates forming of the unit loads, as each package 12 should be delivered at the same height.

In use the transversal bars 4 are moved to and normally locked in positions adapted to the size of the unit load to be formed. It is possible to use only two of the transversal bars 4 at the time, depending on if two or four loading ledges 8 are to be used for the unit load. It is also possible to form two unit loads at the time in parallel as indicated above. Furthermore, the moveable cups 5a are moved and locked to give the loading ledges 8 proper positions for forming a unit load. The positions of the transversal bars 4 and the cups 5a are maintained for as long as identical unit loads are to be formed.

When a new type of unit loads are to be formed the fixture is adapted accordingly, in the same way as described above.

Dependent on the size of the packages 12 of the unit load a bottom board 14 may be used to bridge the distance between the loading ledges 8. If a bottom board is to be used it is first placed on the loading ledges 8. Then a number of packages are placed on the loading ledges 8 to form the unit loads.

After the unit load has been completed it may be strapped still placed on the fixture. Strapping means that the unit load is furnished with straps 13 to keep the unit load and loading ledges 8 together. It is also possible to transport the unit load to a special strapping station. Furthermore, the unit load may be wrapped in plastics or m the like, as is well known to a person skilled in the art. Normally, the unit loads are transported by means of forklift trucks or the like from the fixture. The forks are normally inserted in the space formed between a loading ledge 8 and a long strut 1 or transversal bar 4 of the fixture.

Often the fixture is placed at the end of a conveyor bringing packages one at the time to the position of the fixture.

The invention claimed is:

1. An apparatus for forming unit loads, comprising:

a fixture having an approximate rectangular frame, formed of at least two parallel long struts and at least two parallel short struts at the ends of the long struts, wherein transversal bars are arranged moveable on the long struts, with the ends of each bar on each long strut; the transversal bars having support that receive and slide on the long struts so that the transversal bars are moveable on the long struts:

a plurality of cups attached to each transversal bar, wherein at least some of the cups having cup supports that straddle the transversal bar it is mounted on to be moveable on the transversal bars; the at least some cups are moveable along a length of the respective transversal bar upon which each moveable cup is mounted; the at least some cups each having a lock member extending through the respective cup support and to the respective transversal bar to be lockable on the transversal bars; and a plurality of loading ledges, each ledge having at least two feet, wherein each foot of the at least two feet of each loading ledge is received in a different one of the cups, wherein one or more packages is received on the loading ledges to form the unit load.

2. The apparatus of claim 1, wherein a further number of intermediate, short struts are arranged between the long struts.

3. The apparatus of claim 1, wherein two cups are arranged on each transversal bar.

4. The apparatus of claim 1, wherein four transversal bars are received on the frame.

5. The apparatus of claim 1, wherein each movable cup has a support, having legs straddling a transversal bar: and the lock member includes a locking screw received in an opening of one of the legs of the support.

6. The apparatus of claim 1, wherein the transversal bar supports straddle the long sides of the frame and the supports having locking means to lock the position of the transversal bar.

7. A method for forming unit loads, comprising the steps of:

arranging moveable and lockable cups on a fixture, the fixture having an approximate rectangular frame, formed of at least two parallel long struts and at least two parallel short struts at the ends of the long struts, wherein transversal bars are arranged moveable on the long struts, with the ends of each bar on each long strut and the cups are arranged on the transversal bars; the transversal bars having support that receive and slide on the long struts so that the transversal bars are moveable on the long struts; the cups having cup supports that straddle the transversal bar it is mounted on to be moveable along a length of the respective transversal bar upon which each moveable cup is mounted;

arranging a plurality of loading ledges, each loading ledge having at least two feet, on said fixture by inserting each foot of the at least two feet of each of the loading ledges into a different one of the cups;

placing at least one or more packages on the plurality of loading ledges to form the unit load.

8. The method of claim 7, wherein a further number of intermediate, short struts are arranged between the long struts.

9. The method of claim 7, wherein the step of arranging moveable and lockable cups on a fixture includes arranging two cups on each transversal bar.

10. The method of claim 7, wherein four transversal bars are received on the frame.

11. The method of claim 7, wherein the step of arranging moveable and lockable cups on a fixture includes arranging cups in which each moveable cup has a cup support, having legs straddling a transversal bar and a locking screw received in an opening of one of the legs of the support.

12. The method of claim 7, wherein the transversal bar has supports straddles the long sides of the frame and the supports having locking means to lock the position of the transversal bar.

* * * * *